United States Patent
Kneckt et al.

(10) Patent No.: US 10,194,468 B2
(45) Date of Patent: Jan. 29, 2019

(54) WIRELESS CHANNEL RESERVATION

(71) Applicant: Apple Inc., Cupertino, CA (US)

(72) Inventors: Jarkko Kneckt, Campbell, CA (US); Guoqing Li, Campbell, CA (US); Christiaan A. Hartman, San Jose, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/449,652

(22) Filed: Mar. 3, 2017

(65) Prior Publication Data

US 2017/0257888 A1    Sep. 7, 2017

Related U.S. Application Data

(60) Provisional application No. 62/304,080, filed on Mar. 4, 2016.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ........... H04L 2012/5608; H04L 12/413; H04L 12/40084; H04L 49/254; H04L 2012/5678; H04W 84/12; H04W 88/08; H04W 80/04; H04W 88/06; H04W 74/0816; H04W 74/0825; H04W 74/08; H04W 8/26; H04W 84/18
USPC .... 370/310.2, 328, 338, 445, 448, 447, 462, 370/461, 349
See application file for complete search history.

(56) References Cited

U.S. PATENT DOCUMENTS

| | | | |
|---|---|---|---|
| 2013/0294394 A1 | 11/2013 | Kneckt et al. | |
| 2016/0366701 A1* | 12/2016 | Chu | H04W 74/0816 |
| 2017/0006542 A1* | 1/2017 | Huang | H04W 48/20 |

OTHER PUBLICATIONS

Stacey, Robert et al.; IEEE P802.11, Wireless LANs, Proposed TGax draft specification; doc.: IEEE 802.11-16/0024r1; Mar. 2, 2016; 160 pgs.
Ahn, Jinsoo et al.; NAV cancellation issues on MU protection; doc.: IEEE 802.11-16/0087r1; Jan. 19, 2016; 15 pgs.

* cited by examiner

*Primary Examiner* — Brenda H Pham
(74) *Attorney, Agent, or Firm* — Dickinson Wright RLLP

(57) ABSTRACT

Determining wireless local area network (WLAN) channel medium usage information by WLAN access points (APs) and WLAN stations (STAs) is disclosed. A new medium access control (MAC) duration field in a request to send (RTS) message provides a duration value to be conveyed in a subsequent clear to send (CTS) message. A channel or bandwidth can then be quickly used if an addressed STA does not respond to the RTS message. Also, a STA recognizes an unexpected silence and accesses the medium when a trigger frame is followed by a CTS timeout interval. In a third embodiment, an AP requests that STAs monitor particular channels to obtain network allocation vector (NAV) information. The STAs then respond (or informatively, do not respond) to RTS messages; thus, allowing the AP and other listening devices to determine channel medium information. The AP can then schedule data exchanges based on the determined information.

20 Claims, 10 Drawing Sheets

WIRELESS CHANNEL RESERVATION

CROSS-REFERENCE TO RELATED APPLICATION

This application claims benefit of U.S. Provisional Patent Application No. 62/304,080, "WIRELESS CHANNEL RESERVATION," filed Mar. 4, 2016, which is hereby incorporated by reference.

FIELD

The described embodiments relate to wireless communication, including determining reservation information of a shared medium and making effective use of the shared medium based on the determined information.

BACKGROUND

A wireless local area network (WLAN) often includes an access point (AP) and one or more WLAN stations (STAs). As the AP and STAs share a common wireless medium, transmissions and collisions on the medium are common. The Institute of Electrical and Electronics Engineers (IEEE) has defined a standard for WLAN medium access control (MAC) and physical (PHY) layers. A recent version of this standard is "Part 11: Wireless LAN Medium Access Control (MAC) and Physical Layer (PHY) Specifications," IEEE Std. 802.11™-2012, Mar. 29, 2012, (2,793 pages) (hereinafter "IEEE 802.11"). A STA is an addressable unit in the IEEE 802.11 standard. Other wireless local area network standardization schemes and activities exist. The Third Generation Partnership Project (3GPP) has created a concept known as License Assisted Access (LAA) to unlicensed spectrum.

An AP is a physical or a virtual device that provides access, via a wireless medium (WM), for associated STAs to another network, such as the Internet. Devices in a WLAN communicate with each via the shared WM. STAs send, receive and/or interfere with each other on the shared WM. A STA is in-range of another STA when it can detect a transmission from the other STA directly.

SUMMARY

Representative embodiments set forth herein disclose various systems and techniques for obtaining reservation information of a shared medium and making efficient use of the shared medium based on the obtained information.

In some embodiments, an AP transmits an MU-RTS frame comprising a first, immediate or current NAV value in a first duration field of a MAC frame and a second, subsequent or next NAV value in a second duration field of the MAC frame. The first NAV will be set by observing STAs after the transmission of the MU-RTS frame. The first NAV value informs listening STAs of a reservation time corresponding to a CTS timeout value. The second NAV value does not immediately reserve the channel. The MU-RTS frame addresses a first STA on a first channel, a second STA on a second channel and in some embodiments, other STAs on the first channel, second channel and/or other channels. Each channel represents a bandwidth. In general, a bandwidth may be referred to as a channel herein. Transmission over multiple bandwidths can be accomplished using a PPDU. In some embodiments, a first MU-RTS frame with a given addressing content is sent on a first channel or bandwidth and a copy of the first MU-RTS frame with the given addressing content is sent on a second channel or bandwidth. Using a PPDU, a single PPDU transmission can include the first and second MU-RTS frames in the PPDU bandwidth.

The first STA may, in some embodiments, respond to the MU-RTS frame with a CTS frame on the first channel comprising a duration field bearing the second NAV value. In some embodiments, the second NAV value informs listening STAs that the first channel is reserved for a duration of time sufficient for transmission of a trigger frame and one or more subsequent PPDUs. The trigger frame, in some embodiments, organizes transmissions on resources reserved based on MU-RTS and CTS frames and to set the full length NAV around the MU-RTS transmitter. Alternatively, a DL SU (single user) or DL MU PPDU may be transmitted. The transmission power of the PPDU sets CCA and duration provides NAV at observing STAs.

Alternatively a DL SU or DL MU PPDU may be transmitted. The transmission power sets CCA and duration provides NAV. In some embodiments, a third STA listens to the second channel, but observes no WLAN preamble signal on the second channel during a period of time corresponding to the first NAV value. The third STA then accesses the channel by initiating backoff procedures and subsequent transmission according to shared WM protocol rules.

In some embodiments, an AP transmits, on a first channel during a first time interval, a first trigger frame comprising a first NAV value in a duration field of a MAC frame. The AP also transmits, on a second channel during the first time interval, a second trigger frame comprising a second NAV value in the duration field of a second MAC frame. The first NAV value informs listening STAs of a reservation time needed for transmissions of one or more UL and DL PPDUs by the AP and by the STAs addressed by the first and second trigger frames. In some embodiments, a third STA listens to the second channel, but observes no WLAN preamble signal from a STA responding to the trigger frame during a period of time corresponding to an UL MU data packet duration value. The third STA then accesses the channel by initiating backoff procedures and subsequent transmission according to shared WM protocol rules.

In some embodiments, an AP obtains channel medium information by requesting that a first STA listen on a first channel during a particular time interval before an RTS frame. The first STA tunes to the first channel during the particular time interval according to an observation interval scheme parameterized by the AP. The first STA waits for the expected RTS frame from the AP. When the AP sends a first RTS frame on the first channel at a first RTS time, the first STA transmits a first CTS frame if the CCA of the first channel obtained during observation is idle and the NAV value in the first STA for the first channel is at a reset, zero, or null value. During the same time, the AP may, in some embodiments, request that a second STA observe a second channel during the particular time interval using a same or different observation interval scheme (same or different with reference to the first STA). Similarly, when the AP sends a second RTS frame on the second channel at the first RTS time, the second STA transmits a second CTS frame if the CCA of the second channel is idle and the NAV value in the second STA for the second channel is at a zero value. However, if the second channel is not idle or the NAV value in the second STA for the second channel indicates that the second channel is under a current reservation, the second STA does not transmit anything. The AP processes and/or senses the responses received (and/or recognizes that some responses were not received) on the first and second channels after the first and second RTS frames sent at the first RTS time. The AP then, in some embodiments, transmits trigger frames on zero, one, or both of the first and second channels soliciting UL data from zero, one or more of the first STA, second STA, and/or other STAs. Transmission or lack of transmission of the trigger frames is based on the channel medium information the AP obtains from the CTS frames received or sensed and/or not received or not sensed from the first and second STAs.

This Summary is provided merely for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
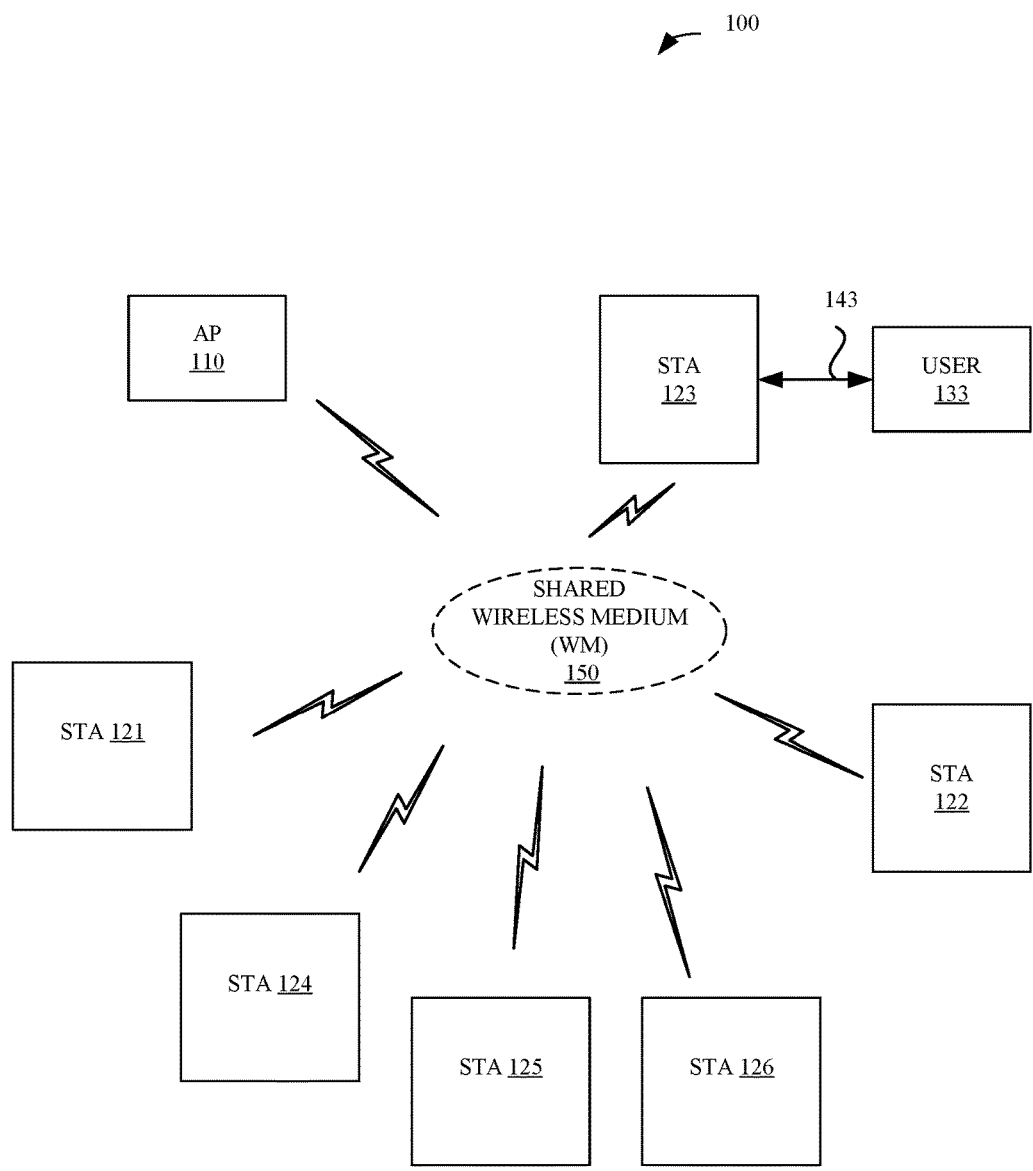
FIG. 1 illustrates an example system including an AP in communication over the WM with several STAs, according to some embodiments.

Obtaining and/or determining information concerning current and future use of the WM is addressed by representative embodiments set forth herein. In other words, techniques and embodiments are provided for APs and/or STAs to obtain and/or determine current usage information and imminent usage information of a shared channel medium.

A network referred to as a basic service set (BSS) is the basic building block of an IEEE 802.11 WLAN. Two STAs that belong to a BSS are able to communicate directly. An AP is any entity that has STA functionality and enables access to an architectural component referred to as the distribution system (DS) in the IEEE 802.11 standard. By means of an AP, a given STA can communicate with entities outside of a coverage area of a BSS to which it belongs. The primary channel is a common channel of operation for all STAs that are members of the BSS. A beacon is a recurring time-related management frame message sent from an AP. The primary channel of a BSS may also be referred to as a bandwidth. For example, a BSS can use a 20 MHz bandwidth, 40 MHz bandwidth, or another bandwidth.

Furthermore, a STA can buffer data before transmission. This data is typically referred to as traffic. In general, there can be more than one kind of traffic, and therefore, more than one buffer in a STA. Additionally, there may be different urgencies or delay-tolerances (which are sometimes referred to in general as quality of service or QoS) associated with the different buffers. Prompt establishment of channel access is needed for many traffic types.

The IEEE 802.11 standard also defines various PHY services. More than one PHY is defined within the standard. Each PHY can include a physical layer convergence procedure (PLCP) layer and a physical medium dependent (PMD) function. The PMD defines methods of transmitting and receiving data through a WM between two or more STAs.

An amendment to IEEE 802.11 known as IEEE 802.11ac provides for multi-user multiple input, multiple output (MU-MIMO) techniques. In the MU-MIMO of IEEE 802.11ac, an AP or STA with more than one antenna transmits a PPDU to multiple receiving STAs over the same radio frequencies and each receiving STA simultaneously receives one or more space-time streams. IEEE 802.11ac includes primary channel bandwidths of 20 MHz, 40 MHz, and 80 MHz and a secondary 20 MHz channel. The secondary 20 MHz channel may also be referred to as a secondary channel. The primary channel and the secondary channel may be used together. Several frequency topologies are possible. IEEE 802.11ac includes definitions of high throughput (HT) PPDUs and very high throughput (VHT) PPDUs.

One PHY in IEEE 802.11 is orthogonal frequency-division multiplexing (OFDM) using subcarriers modulated with various levels of quadrature amplitude modulation (QAM) and binary phase shift keying (BPSK) in some cases. Orthogonal frequency division multiple access (OFDMA) is planned based on an amendment to IEEE 802.11. Certain aspects of OFDMA are described in the planned amendment to the IEEE 802.11 standard known as "IEEE 802.11ax." "Specification Framework for TGax, doc.: IEEE 802.11-15/0132r8," Sep. 22, 2015 (hereinafter "IEEE 802.11ax Framework"), is a standards framework document that outlines planned topic areas for the development of IEEE 802.11ax. Several features of IEEE 802.11ax are devoted to high efficiency (HE) and so some MAC definitions in IEEE 802.11ax have a suffix of "HE." Subsequent to developing the IEEE 802.11ax Framework, the IEEE published "Proposed TGax draft specification," Mar. 2, 2016 (hereinafter "IEEE 802.11ax draft specification"). In the IEEE 802.11ax draft specification, a STA may support DL and UL OFDMA.

In an MU-MIMO RU, there may be support for up to eight users with up to four space-time streams per user up to a limit.

The IEEE 802.11ax Framework provides for 20 MHz, 40 MHz, and 80 MHz OFDMA tone plans based on resource units (RUs). A tone is an OFDM subcarrier. Each RU can include, for example, 16, 52, 106, 242, 484, or 996 tones, depending on the bandwidth of the OFDMA tone plan and the number of RUs in the plan. A STA transmitting over a 20 MHz OFDMA tone plan can be referred to as transmitting over a 20 MHz channel. An AP transmitting over a first and a second 20 MHz OFDMA tone plans can be referred to as transmitting over first and second 20 MHz channels. Because OFDMA is a multiple access scheme, an AP transmitting over a 20 MHz channel can be addressing one, two, or more recipient STAs simultaneously over the 20 MHz channel using different RUs. Also, using MU-MIMO, an AP can address two or more STAs using a single RU, for example, at the same time. OFDM and OFDMA concepts are further described in the IEEE 802.11ax draft specification.

RU locations of 20 MHz, 40 MHz, and 80 MHz PPDU bandwidths are illustrated in the IEEE 802.11ax draft specification. The PPDU bandwidth includes multiple RUs and each RU includes multiple tones. A receiving STA may observe only a portion of the RUs within a PPDU bandwidth. For example, a PPDU bandwidth may be 40 MHz, and a receiving STA may only detect and recover information from RUs within the lower or upper 20 MHz bandwidth of the 40 MHz PPDU bandwidth, in some embodiments. The lower 20 MHz bandwidth may be referred to herein as a channel $C_1$ and the upper 20 MHz bandwidth referred to herein as a channel $C_2$, in some embodiments. The IEEE 802.11ax draft specification discusses PPDUs, bandwidths, RUs, tones and STA receive bandwidths.

A STA may include a station management entity (SME), a MAC layer management entity (MLME) and a physical layer management entity (PLME). Moreover, the layers and devices can communicate with each other with standardized primitives defined at service access points (SAPs). Single units of data and/or control information within a layer are called protocol data units (PDUs). For example, a PDU at the physical layer convergence procedure (PLCP) layer is referred to as a PPDU.

The MAC layer in the IEEE 802.11 standard supports a QoS facility. In particular, the QoS facility may support various priority values. A priority value is referred to as a user priority (UP). For example, a STA may inform an AP of QoS information for a given traffic flow using a QoS control field. The QoS control field may include a traffic identifier (TID) and buffer information about data corresponding to the TID. The terms "traffic identifier" and "TID" are used interchangeably herein. Information flow within a STA between layers may be via SAPs. Moreover, the units that flow across a SAP are called MAC service data units (MSDUs), and a TID is a label that distinguishes MSDUs and is used to support QoS by MAC entities. Furthermore, a TID value may specify a traffic category (TC) or a traffic stream (TS). A TC may indicate a distinct user priority (UP) among MSDUs for delivery over a given link, and a TS may be a set of MSDUs to be delivered subject to QoS parameter values provided to the MAC in a particular traffic specification (TSPEC). More details on the QoS facility of the MAC layer are provided in the IEEE 802.11 standard.

The IEEE 802.11 MAC layer provides access to the WM via a distributed coordination function (DCF). The main access mechanism of IEEE 802.11 is a DCF known as carrier sense multiple access with collision avoidance (CSMA/CA). For a STA to transmit, it senses the medium to determine if another STA is currently transmitting. When a first STA is not able to sense the presence of a second STA using CSMA/CA, the second STA is referred to as hidden with respect to the first STA. If the STA sensing the WM finds the WM to be busy, it defers attempting to transmit until the end of the current transmission. Prior to attempting to transmit, the STA selects a random backoff interval and decrements a backoff interval counter while the WM is idle. After the backoff interval counter reaches zero, if the WM is still idle, the STA can transmit. In order to further reduce the probability of collision on the WM (for example, transmission collision with a hidden STA), short control frames known as Request to Send (RTS) and Clear to Send (CTS) can be used. These procedures of the IEEE 802.11 standard, including IEEE 802.11ac, may be referred to herein as shared WM protocol rules or as WM protocol rules.

Carrier sense can be performed both through physical and virtual techniques. The physical technique is known as clear channel assessment (CCA) and can include an energy measurement or received signal strength indicator (RSSI) measurement. The physical technique is referred to as sensing. The virtual CS mechanism, based on a state variable or value called the network allocation vector (NAV), is achieved by distributing reservation information announcing the impending use of the WM. The NAV provides a prediction of future traffic on the WM based on duration information that is announced in RTS/CTS frames prior to the actual exchange of data. The duration information is also available in the MAC header of many frames. Demodulating and recovering the data of an observed frame is referred to as receiving. The CS mechanism combines the NAV state and the STA's transmitter status with physical CS (CCA) to determine the busy/idle state of the medium. The NAV may be thought of as a counter which counts down to zero at a given rate. When the counter reaches zero or the NAV is reset, the virtual CS indication is that the channel is idle. When the counter is not zero, the CS indication is that the channel is busy.

A STA may maintain two NAV values. One may be an Intra-BSS NAV and the other a OBSS NAV. When an observing STA obtains a NAV value in a MAC frame, it also checks the transmitter address field of the MAC frame. Based on the transmitter address, the observing STA knows whether the transmitting AP or STA is in the BSS with the STA. If the transmitting AP or STA is in the BSS, the observing STA sets the intra-NAV. If the transmitting AP or STA is not in the BSS, the observing STA sets the OB SS NAV. The OBSS NAV can be neglected if so commanded by an AP. There may be additional criteria to set the NAV; for example, the energy level of an observed frame must exceed a threshold in order for the corresponding duration field to be used in setting the NAV.

The duration field may be set to the time required to transmit the pending frame, plus one CTS frame, plus one Ack or Block Ack frame if required and applicable interframe spaces (IFSs). In an MU-RTS frame, the duration field may be set to the estimated time required for the pending transmission.

The exchange of RTS and CTS frames prior to the actual data frame distributes WM reservation information. The RTS and CTS frames contain a duration field that defines the period of time that the medium is to be reserved to transmit the actual data frame and a returning ACK frame. A STA receiving either the RTS (sent by the originating STA) or the CTS (sent by the destination STA) shall read the medium reservation. Thus, a STA can determine information about an impending use of the WM. Thus, exchange of MU-RTS frames and simultaneous CTS responses prior to actual data frames distributes WM reservation information.

In a CTS frame that is transmitted in response to an MU-RTS frame, the duration field is set to the value obtained from the duration field of the MU-RTS frame that elicited the CTS frame minus the time between the end of the PPDU carrying the MU-RTS frame the end of the PPDU carrying the CTS frame.

The MU-RTS frames are transmitted as non-HT Duplicate PPDUs. This means that the frames are copies of each other. The MU-RTS frame will be addressed to the same address in all channels or bandwidths. There are instructions per responding STA; in some embodiments, the responding STAs may only receive the MU-RTS transmitted on their primary channel. The energy of a CTS frame in a secondary channel or bandwidth may be detected by a STA. The duration of the energy, or span in time, corresponds to the duration of the CTS frame.

The MAC layer in a STA can construct MAC frames. A MAC frame may include a MAC header, a variable length frame body, and a cyclic-redundancy check field called the FCS. The MAC header may include an instance of the duration field mentioned above, and address information. The MAC header can also include QoS control information and HT control fields (where HT stands for high throughput). The QoS control information, if present, may be in a subfield known as the QoS Control field. The QoS control field can also include information related to the data buffer associated with the TID, such as a TXOP duration requested value or a queue size value. The IEEE 802.11ax Framework specifies that the IEEE 802.11ax specification will have a variation of the HT Control field, which is called the HE control field.

An RTS frame is a type of MAC frame and can include, along with a duration field, RA and TA address fields. The RA field of the RTS frame is the address of the STA, accessible via the WM, that is the intended immediate recipient of the pending individually addressed message (data or other frame). The expressions "frame" and "message" are used interchangeably herein. The TA field is the address of the STA transmitting the RTS frame. The duration value indicated in the duration field can be the time required to transmit the pending data frame, plus one CTS frame, plus one ACK frame plus three short interframe space (SIFS) intervals.

The CTS frame includes an instance of the duration field and an RA field. The RA field of the CTS frame is copied from the TA field of the immediately previous RTS frame to which the CTS frame is a response. The duration value placed in the CTS frame duration field is obtained by taking the value from the duration field of the immediately previous RTS frame and subtracting the time required to transmit the CTS frame and an SIFS interval. More details of RTS-CTS technique can be found in the IEEE 802.11 standard.

Enhanced distributed channel access (EDCA) is a prioritized CSMA/CA access scheme used by STAs and APs supporting QoS. A transmission opportunity (TXOP) in EDCA is defined by rules which permit access to the WM. There is typically a delay or latency between initiation of EDCA by a STA to send data and successful transmission of that data because the WM is an unscheduled shared medium prone to collisions when accessed via EDCA. Long delays are unacceptable for many types of traffic.

The IEEE 802.11 standard also provides a collection of features called services. Two example services that can be provided by an IEEE 802.11 WLAN are MSDU delivery and QoS traffic scheduling. QoS traffic scheduling can be contention-based or by controlled channel access. At each TXOP, an IEEE 802.11 STA may select a frame for transmission based on a requested UP and/or parameter values in a TSPEC for an MSDU.

The QoS control field can be sent by a STA to an AP to indicate buffered traffic associated with a given TID awaiting transmission. The receiving AP can use the received QoS control field to schedule controlled channel access, i.e., an uplink transmission opportunity for the STA to send a portion of the data associated with the TID indicated in the QoS control field received by the AP.

According to the IEEE 802.11ax Framework, resource allocation information for one or more addressed STAs can be sent by an AP in a control frame called a trigger frame. The trigger frame may convey or carry sufficient information to identify the STAs transmitting uplink (UL) multiuser (MU) PPDUs and the trigger frame may allocate resources for the addressed STAs to transmit those UL MU PPDUs at a certain time interval subsequent to the trigger frame. The transmissions from all of the STAs contributing to the UL MU PPDU may end at a time indicated in the trigger frame.

The trigger frame is used to allocate resources for UL MU transmission and to solicit UL MU transmissions subsequent to the trigger frame. An MU-RTS frame may request that a STA respond with a CTS frame. An RU allocation subfield in a per-user information field addressed to the STA may indicate whether the CTS frame is to be transmitted on the primary 20 MHz channel, or another channel. A STA addressed by an MU-RTS frame may transmit a CTS response after the end of the PPDU containing the MU-RTS frame if the MU-RTS frame has a per-user information field addressing the STA and if the medium is idle according to CS mechanisms.

An AP can poll STAs according to the IEEE 802.11ax Framework to determine the buffer status of the respective STAs. Based on the results of the poll, the AP can schedule resources for the STAs. A given STA can respond with a QoS data frame or with a QoS null data frame. The scheduled STAs then transmit some of the data from their buffers using the scheduled resources. Having accurate buffer status reports at the AP is important to permit the STAs to transmit data from buffers in a timely manner.

Some problems associated with reserving the WM are as follows: i) an MU-RTS message may be long in time and slow down access to the WM, ii) a STA with data to send may consider the channel busy due to a non-zero NAV value although no other STA actually transmits during at least a portion of the time indicated by the STA's NAV value, and iii) an AP may wish to initiate simultaneous communications with multiple STAs over multiple 20 MHz channels, yet the AP may not know of ongoing or impending transmissions on one or more of the channels.

MU-RTS with Two Duration Fields

In an exemplary embodiment, a transmitter transmits two or more MU-RTS frames. The transmitter may be, for example, an AP operating in infrastructure mode. The MU-RTS frames may include two duration fields. In some embodiments, the first duration corresponds approximately to the length of a CTS frame. In some embodiments, the second duration corresponds to channel reservation time or transmit opportunity (TXOP) minus the length of a CTS frame. The first duration field is interpreted as distributing WM reservation information from the end of the frame in which the first duration field resides. The second duration field is interpreted as distributing WM reservation information with regard to one or more future frames. In some embodiments, the one or more future frames are transmitted by the STA or AP that received the MAC frame including the first duration field.

The MU-RTS frames solicit CTS information from multiple STAs. In general, there may be one MU-RTS frame per WLAN channel, or there may be a single MU-RTS frame soliciting responses over multiple channels. In some embodiments, a given MU-RTS frame is transmitted over a given channel, and copies or duplicates of the given MU-RTS frame are transmitted over one or more other channels. The first duration field is a current or immediate duration field. For example, the first duration field is read by observing STAs and used to update their NAV values. The second duration field is a next or subsequent duration field. Recipient(s) of the MU-RTS transmit CTS frames and populate the duration field of the transmitted CTS frame with the second duration value obtained from the MU-RTS frame (note transmission of a CTS is conditional on CCA and virtual CS/NAV). In some embodiments, a purpose of the second duration field is to extend the NAV state in the listening STAs in the event that a CTS frame is actually transmitted. For some embodiments, a first duration value in the first duration field has units of one microsecond and a second duration in the second duration field may have different units, for example, units of four microseconds. In some embodiments, the values in the first and second duration fields have the same units.

The MU-RTS transmitter solicits CTS responses from two or more STAs using the MU-RTS frames. The value in the first duration field in the MU-RTS frames may be based on a CTS timeout value that is to be effective immediately. The CTS timeout value corresponds to a period after an MU-RTS during which a responding STA will send a CTS. For example, the STA may reset its NAV if no indication is received from the PHY layer of the STA within a duration of (2×aSIFSTime)+(CTS_Time)+aPHY_RX_START_Delay+(2×aSlotTime). The parameters aSIFSTime, CTS_Time, aPHY_RX_START_Delay, and aSlotTime are IEEE 802.11 standard parameters. In some embodiments, a CTS timeout value may correspond to aSIFSTime+aSlotTime+aPHY_RX_Start_Delay=16+9+20 microseconds=45 microseconds.

The value in the second duration field in the MU-RTS frames may be based on a length of time corresponding to a trigger frame and an UL transmission time, where the trigger frame occurs next after, or subsequent to, a CTS frame. Signaling NAV information using the first and second duration fields is beneficial to listening STAs.

The first NAV value (also referred to as current, or immediate NAV value) is beneficial as illustrated in the following example. A STA not addressed by an MU-RTS frame is referred to as a bystander STA. The bystander STA decodes the MU-RTS frame or frames with respect to a particular channel and determines a NAV value based on a CTS timeout. The bystander STA then listens for a responsive CTS frame on the particular channel, expecting a CTS frame. If the bystander STA does not detect the CTS frame, the NAV value in the bystander STA, in some embodiments, will timeout or count down to zero. If the bystander STA has data to send and the NAV value reaches zero, the bystander STA can begin backoff procedures and access the shared channel according to WM protocol rules.

The second NAV value is also beneficial as illustrated in the following example. A STA addressed by an MU-RTS frame is referred to as a target STA. The target STA decodes the MU-RTS frame or frames with respect to a particular channel and recognizes its own address in the MU-RTS frame. The target STA then evaluates whether it should transmit a CTS frame according to the WM protocol rules. In case i) CCA indicates the channel does not have an ongoing transmission and ii) the NAV value in the target STA is zero, then the target STA transmits a CTS frame. The target STA populates a duration field of the CTS frame with the second (also referred to herein as the next or the subsequent) NAV value based on a channel reservation, including time for a trigger frame and UL data transmission. Other STAs that receive the CTS frame from the target STA update their NAV values according to the duration field present in the received CTS frame. The channel is then protected from attempted WM channel access by the other STAs during a subsequent trigger transmission by the MU-RTS transmitter and a subsequent UL data transmission by the target STA. The other STAs will wait until, at least, expiry of a duration corresponding to the second duration value before beginning backoff procedures to access the shared channel.

After the MU-RTS transmitter sends the MU-RTS frame, the MU-RTS transmitter may receive a single CTS frame, for example, on a primary channel. The presence of other CTS transmissions can be sensed on the other channels using CCA. For example, the MU-RTS transmitter may demodulate and decode a first CTS transmission on a first channel and sense the presence of a second yet simultaneous CTS transmission on a second channel using CCA. In some embodiments, CCA may be performed using an RSSI measurement.

Receiving Unsolicited Data After Trigger and Before NAV Expiration

An AP or other STA may send a first trigger frame to one or more targeted STAs on a first channel. The trigger frame is used to define the resources for a possibly non-contiguous reserved band. The trigger frame specifies how the STAs use the band in their UL transmissions. Alternatively a DL data frame may be transmitted rather than a trigger frame. Transmission of a DL data frame provides energy for CCA for STAs sensing the channel (for example, sensing use RSSI indications, physical CS) and updates NAV values in receiving STAs (for example, receiving includes demodulating and recovering the MAC header of the DL data frame, virtual CS).

The first trigger frame may include a duration field configured to provide a NAV value sufficient to protect the WM for UL and DL transmission known as a TXOP, for example. If none of the one or more targeted STAs respond, the WM might be idle on the first channel until the NAV of the first trigger frame expires. To make efficient use of the first channel, in exemplary embodiments, a third STA listening to the first channel detects that no preamble signal is present after the first trigger frame. Even though the third STA acquired the NAV value in the first trigger frame reserving the WM for the TXOP, the third STA listens and observes or detects whether an UL response commences after the first trigger frame. For example, if the first trigger frame ends at a time $t_2$, and the first trigger frame duration field has value $D_1$, the TXOP may end at a time $t_3=t_2+D_1$. If none of the targeted one or more STAs respond, then the third STA will detect an absence of a preamble. The third STA may then reset the NAV value, commence backoff procedures and access the first channel according to the WM protocol.

In some embodiments, the first trigger frame carries a signaling bit indicating that a listening STA is permitted to reset its NAV value if no preamble is detected by the listening STA after the first trigger frame.

Simultaneous with sending the first trigger frame, the AP may send a second trigger frame on a second channel. The second trigger frame may carry the same TXOP value in the duration field that was carried by the first trigger frame. The second trigger frame, transmitted on a second channel, may be a copy of the first trigger frame sent on the first channel. First and second STAs may respond to the second trigger frame with respective first and second UL data PPDUs. The first and second UL PPDUs may carry data payload, block acknowledgements (BAs), UL queue status, and/or receive operating mode signaling.

The duration indicated in the trigger frame may be of short duration in order to, for example: i) trigger high priority data transmission, ii) obtain information about which DL frames should be transmitted, for example, based on a BA, and/or iii) to find out how much time a STA needs for UL frame transmission.

Getting Channel Monitoring Help from a STA

In order to provide protection from interference to UL and DL transmissions, an AP may determine present and imminent data transmission information by requesting, soliciting, or asking that one or more STAs cooperate in providing WM information to the AP. The AP may command or request that a STA change from an primary channel to a new channel so that the STA can obtain NAV information on the new channel. The new channel may also be referred to as a reserved channel, and the STA to which the command or request is addressed may be referred to as a reserving STA. The AP then obtains control (sometimes referred to as obtaining a TXOP) on the primary channel according to shared WM protocol rules. The new channel, in some embodiments, is out of the context of the primary channel. In this way, for example, STAs using OFDMA access can be ultimately provided with resource assignments evenly distributed across available subcarriers of a channel.

The reserving STA then obtains NAV information of the reserved channel and waits for a trigger frame from the AP. If the CCA mechanism executed or obtained at the AP indicates that the reserved channel is idle, the AP may transmit an RTS frame to the reserving STA on the reserved channel.

In general, to determine more about the WM channel status, the AP transmits RTS frames to a first STA monitoring a first channel and to a reserving STA monitoring a reserved channel. The RTS frame signals the receiving address of the particular STA addressed. A first RTS frame to the first STA monitoring the first channel includes the address of the first STA. A second RTS frame to the reserved STA monitoring the reserved channel indicates the address of the reserved STA. The RTS frames specify the reserved bandwidth (BW) and the reservation mode. The BW may be, for example, 20, 40, 80, or 160 MHz. Exemplary signaling formats are provided in the IEEE 802.11ac standard. The speed of acquiring a reservation with an MU-RTS frame depends on the number of octets in the MU-RTS frame payload.

The first STA and the reserving STA respond after a SIFS with a CTS frame if they detect that the channels they are monitoring are idle according to both the CCA and the virtual CS mechanisms of the shared WM protocol rules.

The AP, in some embodiments, only demodulates and recovers the payload information from the CTS message sent to it on the primary channel of the AP. The AP can detect or sense energy, using CCA for example, on other (reserved) channels. Thus the AP determines from the STAs' NAV information and also determines whether a given STA has observed that the channel the given STA is monitoring is in an idle condition.

The AP sets up or configures the reserving STA to monitor the channel reserved for that STA to monitor. The reserving STA may be, for example, configured during target wake time (TWT) schedule setup of IEEE 802.11 or in a reserving STA setup signaling message flow. The reserving STA determines from this signaling any or all of: i) the reserved channel identity, ii) the offset from a beacon time for a reservation period, iii) a listening repetition interval, and iv) a duration of the reservation period.

An active mode STA may be set to receive on a reserved channel during an entire NAV determining time epoch (or time to determine NAV time interval).

The AP requests that a STA become a reserving STA and the STA receiving the request may accept or decline the request. In some embodiments, the STA receives a data PPDU, acknowledges the data PPDU, and then accepts the request. The AP may, in some embodiments, allocate more transmission time to a reserving, or cooperating, STA.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

System

FIG. 1 illustrates an exemplary WLAN system 100 making use of a shared wireless medium, or shared WM, 150. The WLAN system 100 includes an AP 110 and one or more STAs. For example, the WLAN system 100 may include STA 121, STA 122, STA 123, STA 124, STA 125, and/or STA 126. STA 123 is illustrated as being in communication with a user 133 by connection 143. The AP 110 may communicate over one or more IEEE 802.11 channels of various bandwidths. Each channel may represent a number of RUs, tones or subcarriers as described above. Over time, the AP 110 may communicate with the STAs of FIG. 1 using RUs on a given one or more channels. AP 110 may determine present and imminent use of the shared WM 150 via exemplary techniques provided herein. On the basis of this determining, AP 110 and other STAs make use of the shared WM 150. As one example, delays until data reception/transmission completion for STA 123 are mitigated using exemplary techniques disclosed herein, to the benefit of, for example, user 133.

The embodiments presented herein are not limited to AP-centric system topologies. For example, the embodiments presented herein are applicable to, for example, IEEE 802.11 IBSS, Wi-Fi Alliance Direct and Neighborhood Area Network (NAN) topologies. Wi-Fi Alliance® is an industry group. Wi-Fi Direct® is a certification mark for one-to-one device connections. NAN topologies include networks installed by an individual to server a family or a few neighbors.

Second Duration Field

Figure 2:
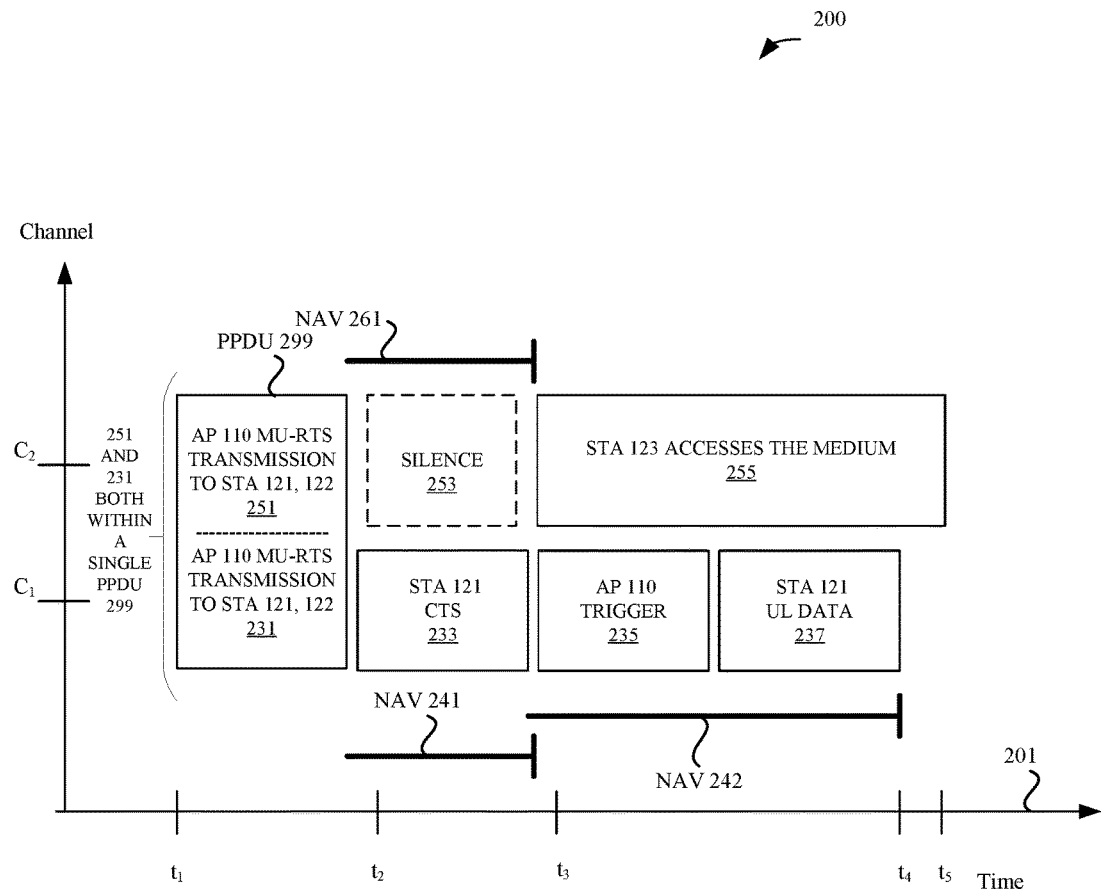
FIG. 2 illustrates exemplary transmission events over first and second channels including first NAV values based on a CTS timeout value and a second NAV value encompassing STA data transmission, according to some embodiments.

FIG. 2 illustrates exemplary signaling flows 200 with respect to a time axis 201 with respect to two channels $C_1$ and $C_2$. $C_1$ and $C_2$ may be, for example, 20 MHz channels. In some embodiments, $C_1$ and/or $C_2$ may be channels of other bandwidths, for example, 40 MHz, or 80 MHz. AP 110 transmits one or more MU-RTS messages using two duration fields. In general, each MU-RTS message is a copy of the same message, but sent simultaneously on several channels. On a channel $C_2$, the first duration field in an MU-RTS message 251 provides NAV value 261. On a channel $C_1$, the first duration field of a MU-RTS message 231 provides NAV value 241, typically a copy of NAV value 261. Messages 231 and 251 occupy a single PPDU 299, in some embodiments. In some embodiments, PPDU 299 may be a 40 MHz PPDU and message 231 may be carried in RUs within the lower 20 MHz of the 40 MHz PPDU 299, for example. STA 121 receives the message 231 and obtains the second NAV value 242 and places it in the duration field of CTS message 233 before transmission. Other STAs observing channel $C_1$ update their NAV values at time $t_2$ with NAV 241 and at $t_3$ with NAV 242, thus channel $C_1$ is protected at least until a time $t_4$. This protects subsequent trigger message 235 and UL data message 237 from interference.

STA 123, observing channel $C_2$, for example, updates its NAV value at time $t_2$ with NAV 261. In some embodiments, STA 123 wishes to access channel $C_2$, and observes silence 253 while its NAV value is counting down. At time $t_3$, STA 123 begins procedures to access channel $C_2$ using the shared WM protocol rules. In the example shown in FIG. 2, STA 123 accesses the shared medium with a message 255 at about, or soon after, the time $t_3$. Message 255 is associated with a NAV value, but this is not shown in FIG. 2 for the sake of simplicity.

NAV 261 corresponds to an expiration of a NAV value in STA 123 that occurs before expiration of the NAV values in busy channel $C_1$. The use of the two duration fields in the MU-RTS message 251 creates the opportunity for STA 123 to obtain early access to the bandwidth of the free channel $C_2$ at time $t_3$.

Exemplary MAC Frame Formats

Figure 3A:
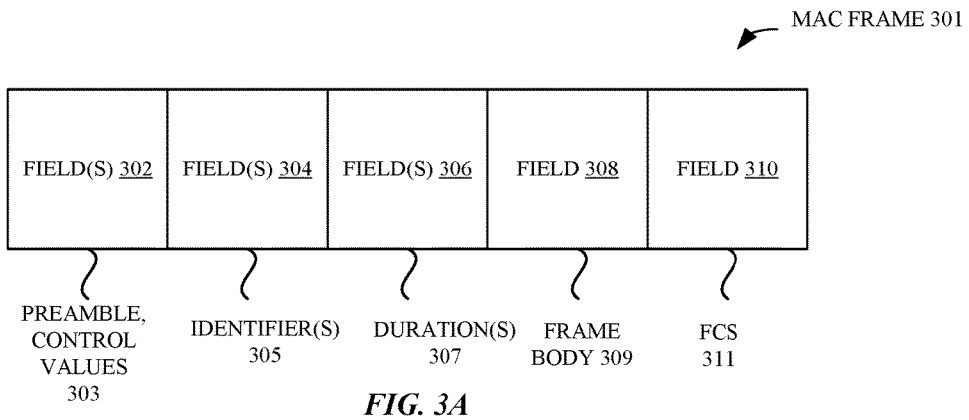
FIGS. 3A-3D illustrate exemplary data fields and data field values of a portion of a MAC frame, a portion of an RTS frame, a portion of a CTS frame, and a portion of an MU-RTS frame, according to some embodiments.

FIGS. 3A-3D illustrate exemplary MAC frame formats. For example, FIG. 3A illustrates a field or fields 302 including preamble and/or control values 303. Field or fields 304 include identifier or identifiers 305. Field or fields 306 include duration or durations 307. Field 308 includes a frame body 309. Field 310 includes an FCS value 311.

Figure 3B:
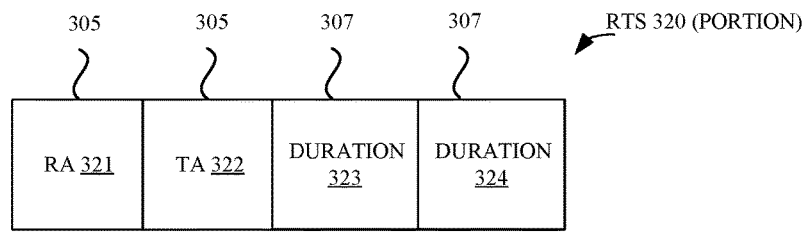

FIG. 3B illustrates a portion of an RTS frame or frame 320 comprising a receiving address field RA 321, a transmitting address field TA 322, a first (current, or immediate) duration field 323 and a second (next, or subsequent) duration field 324. In some embodiments, messages 251 and 231 of FIG. 2 use the format of RTS 320. For example, message 231, in some embodiments, carries NAV value 241 in first duration field 323 and NAV value 242 in second duration field 324.

Figure 3C:
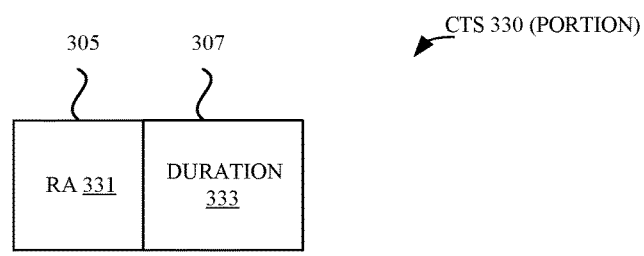

FIG. 3C illustrates a portion of a CTS frame 330. CTS frame 330 may include receiving address field RA 331 and duration field 323. For example, STA 121 may send message 233 including the NAV 242 value in field 333. STA 123 during silence 253 is listening for, or attempting to detect, a CTS frame such as a portion of which is shown in FIG. 3C.

Figure 3D:
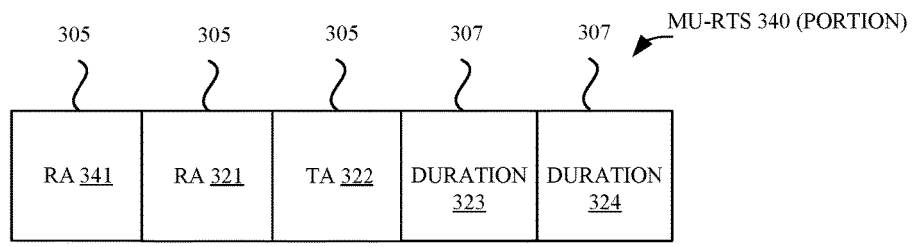

FIG. 3D illustrates a portion of an exemplary MU-RTS frame 340. Two RA fields (341 and 321) are illustrated in FIG. 3D and a TA field 322. The duration fields 323 and 324 are illustrated in FIG. 3D. Message 231, in some embodiments, is an instance of MU-RTS frame 340 and carries NAV value 241 in first duration field 323 and NAV value 242 in second duration field 324.

Figure 4:
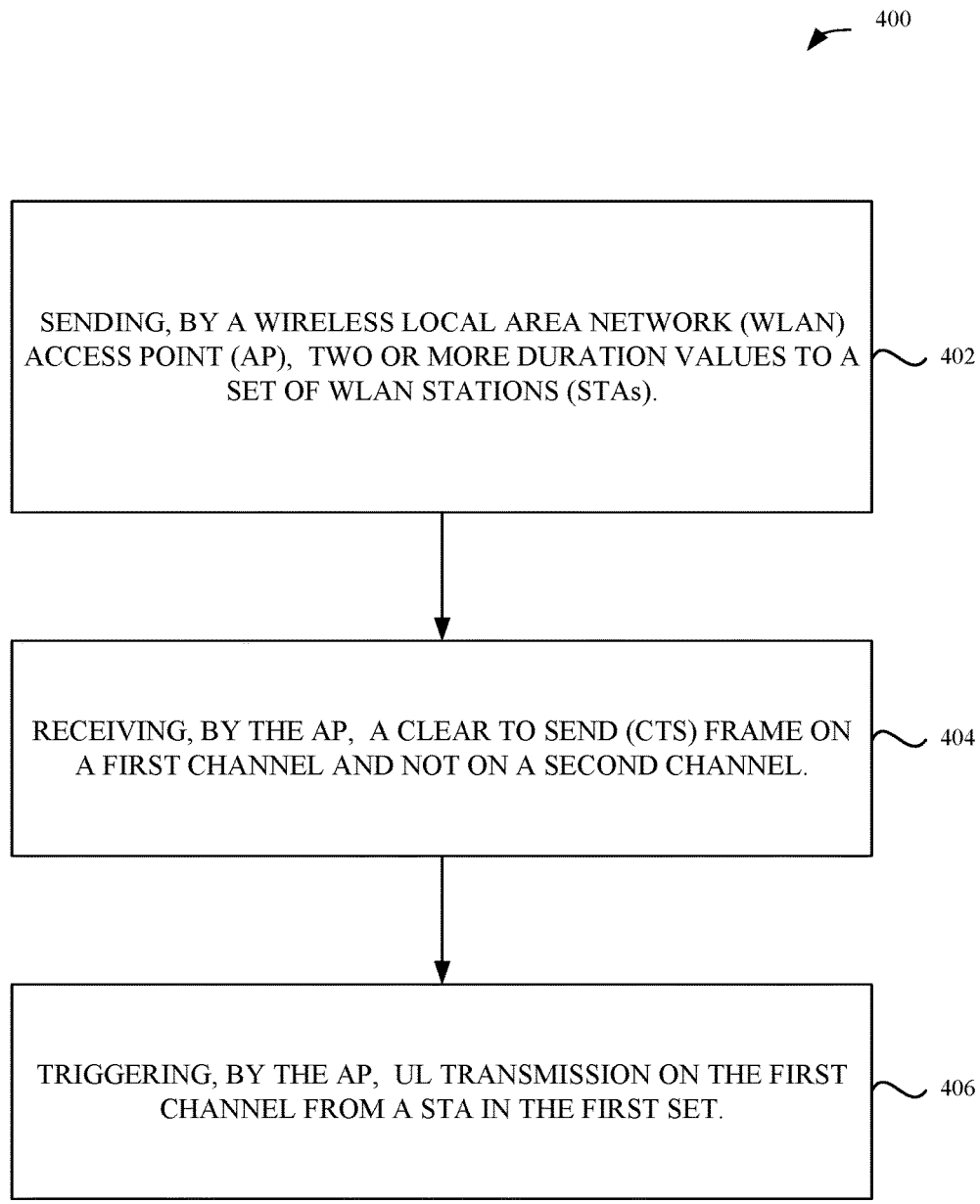
FIG. 4 illustrates exemplary logic illustrative of the events of FIG. 2, according to some embodiments.

FIG. 4 illustrates exemplary logic corresponding to the events of FIG. 2 using the first and second duration fields. At 402, an AP sends, using first and second channels, two or more duration fields to a set of STAs using one or more MU-RTS messages. At 404, the AP receives a CTS frame on the first channel and not on the second channel. At 406, the AP triggers a first UL transmission on the first channel.

Resetting NAV in MU Transmission Following a Trigger Frame

Figure 5:
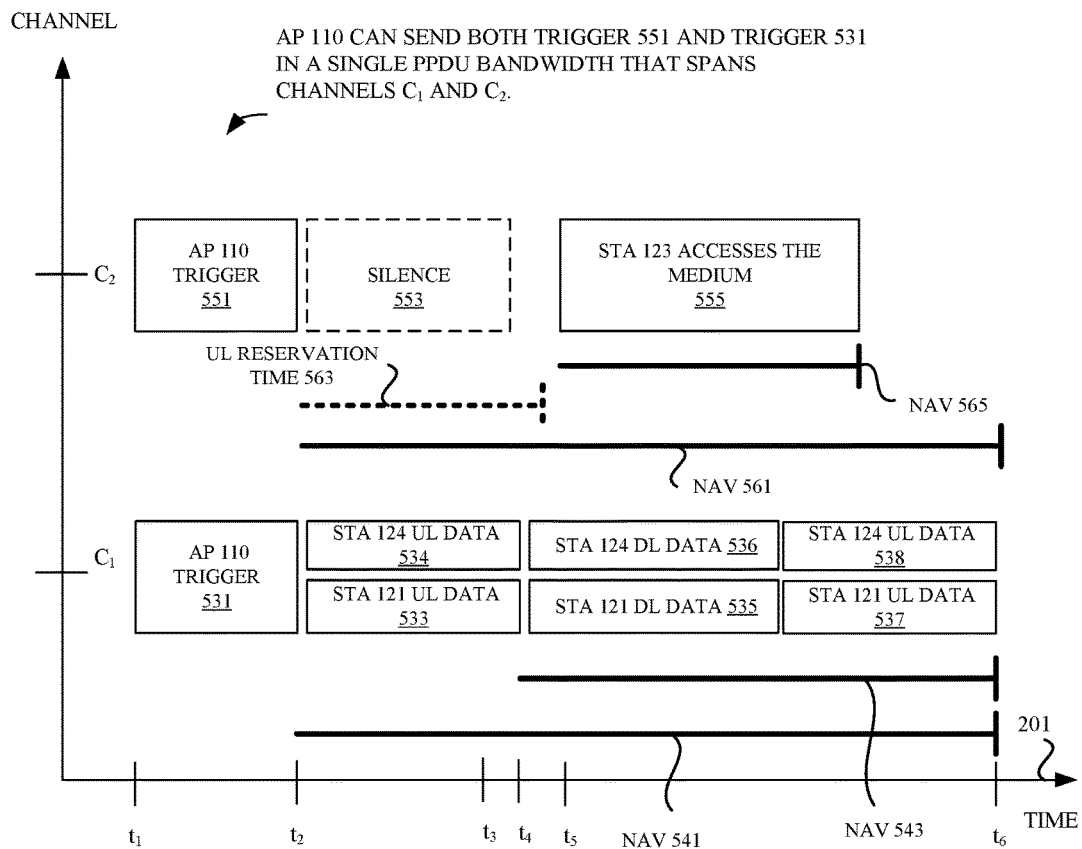
FIG. 5 illustrates a STA accessing a channel despite an initial non-zero NAV value, but after detecting a silence following a trigger frame event, according to some embodiments.

In an exemplary embodiment illustrated in the message flows 500 of FIG. 5, AP 100 uses short UL data allocations to obtain information from the responding STAs and to know which STAs respond to a trigger frame. The trigger frame, in some embodiments, has a single duration field. The trigger frames sets NAV duration for the whole duration of a TXOP. The trigger frame includes multi-user UL transmission times.

A STA may reset the NAV indicated in the trigger frame, if the STA does not receive a preamble within a specified time. The specified time, may be, for example, an UL reservation time plus two SIFS intervals.

FIG. 5 illustrates AP 110 sending trigger frame 551 on the channel $C_2$ at a time $t_1$ and trigger frame 531 on the channel $C_1$ at the time $t_1$. Trigger frames 531 and 551, in some embodiments, are included in a single PPDU that spans $C_1$ and $C_2$. The times $t_1$, etc., of FIG. 5 are not intended to represent the same identical times of the same symbol (e.g., "$t_1$") illustrated in FIG. 2. In general, more than two channels may be used. Two channels are illustrated for simplicity of presentation. Also, the vertical axis is not to scale; e.g., the vertical axis has some spacing between trigger frames 551 and 531 to allow illustration of NAV events.

The trigger frame 531 may include a duration value corresponding to NAV 541 of FIG. 5. NAV 541 reserves the channel $C_1$ for the whole TXOP duration scheduled by the AP 110. STAs 121 and 124 commence communication with AP 110 on the channel $C_1$ with messages 533 and 534. NAV 543 is set by, for example, message 534. DL messages 535 and 536 are then sent, followed by UL messages 537 and 538, all on the channel $C_1$.

The behavior of STA 123, for example, illustrates in FIG. 5 an advantage of an exemplary embodiment. AP observes silence 553 during an UL reservation time 563 up until a time $t_4$. NAV 561 is illustrated as ongoing after time $t_4$. However, at $t_4$, STA 123 resets its NAV value (makes inoperative NAV 561) following sampling, for example at a time $t_3$, silence 553 and initiates access to the channel $C_2$ using the shared WM protocol rules at a time $t_5$. This access to the channel $C_2$ by the STA 123 results in message 555 and a current NAV value on the channel $C_2$ of 565.

AP Method and Logic

In an exemplary embodiment, a method by an AP includes: i) setting a first duration value in a first duration field of a first trigger frame, wherein the first duration value is based a transmission opportunity (TXOP) duration, ii) addressing the first trigger frame, at least in part, to a first WLAN station (STA), iii) setting the first duration value in the first duration field of a second trigger frame, iv) addressing the second trigger frame, at least in part, to a second STA, v) transmitting the first trigger frame on a first channel at a first time, vi) transmitting the second trigger frame on a second channel at the first time, vii) receiving, responsive to the first trigger frame, uplink data on the first channel from the first STA at a second time, and/or viii) receiving no response on the second channel from the second STA to the second trigger frame in a pre-defined time window.

In some embodiments, the second trigger frame includes the same content as the first trigger frame in the method by the AP.

In some embodiments, the first trigger frame carries a signaling field indicating that an observing STA is permitted to reset its NAV value if no responsive frame is detected, in the method by the AP. In some embodiments, this signaling field related to NAV reset is of length 1 bit.

In some embodiments, the observing STA is a High Efficiency (HE) STA as defined by the Institute of Electrical and Electronics Engineers (IEEE) or a wireless communications device compliant with a Wi-Fi Alliance (Wi-Fi) certification, in the method by the AP.

Figure 6:
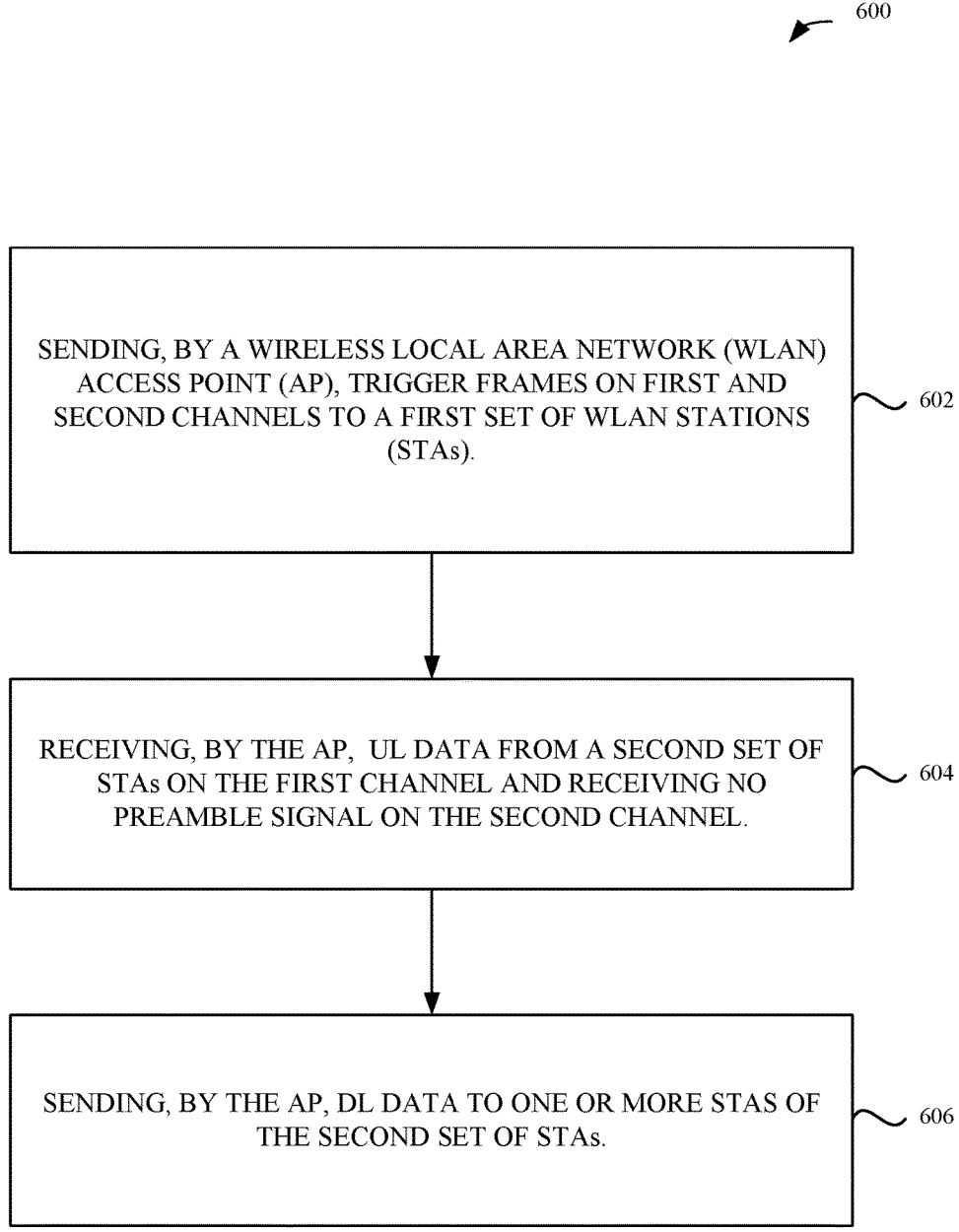
FIG. 6 illustrates exemplary logic illustrative of the events of FIG. 5, according to some embodiments.

FIG. 6 illustrates exemplary logic corresponding to FIG. 5. At 602, an AP sends trigger frames on first and second channels to a first set of STAs. Some or all of the STAs (a second set) addressed on the first channel respond to the trigger frame at 604. At 606, the AP commences communication on the first channel with some or all of the STAs of the second set.

RTS-CTS Signaling with Reserving (Assigning) for Monitoring

Figure 7:
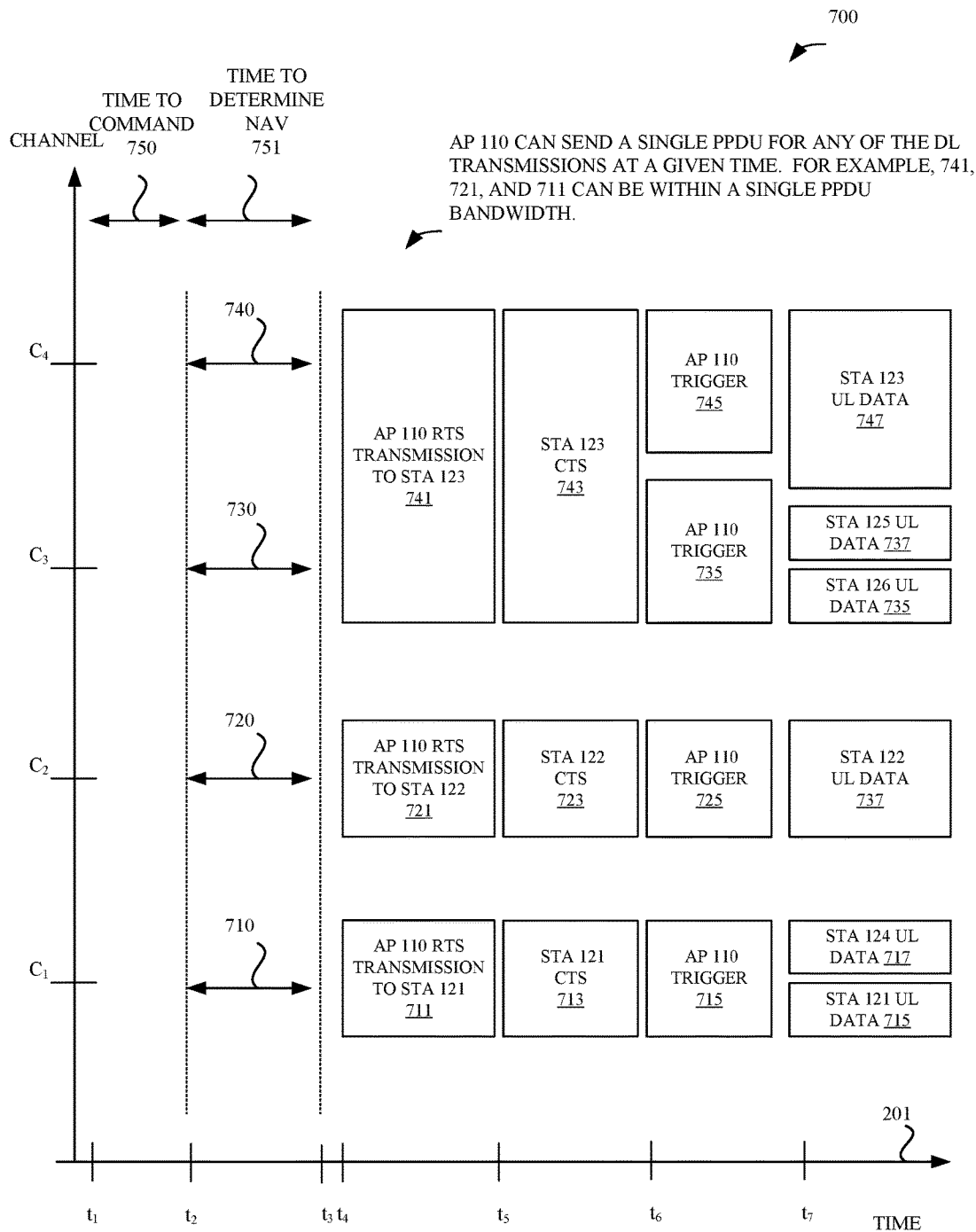
FIG. 7 illustrates an exemplary determination of channel medium events by an AP with the assistance or cooperation of one or more STAs, according to some embodiments.

FIG. 7 illustrates an embodiment of channel medium determining involving four channels, $C_1$-$C_4$. In some embodiments, $C_1$ is a primary channel and $C_2$, $C_3$, and $C_4$ are secondary 20 MHz channels. Three overall epochs are shown in FIG. 7. During a time to command 750 from $t_1$ to $t_2$, an AP configures STAs to help it determine information about the shared WM. During a time to obtain NAV 751 from $t_2$ to $t_3$, AP 110 and various STAs spend at least part of this time sensing channels and obtaining NAV values. During the third epoch, from $t_4$ onward to an indefinite ending time, AP 110 communicates with selected STAs using knowledge obtained during the time to obtain NAV 751. Further details of the time to command 750 and time to obtain NAV 751 are provided in FIG. 8.

STA 121 may observe the channel $C_1$ as a reserving STA during the time interval indicated with the double headed arrow as 710. AP 110 may also listen on channel $C_1$ during 710. AP 110 may then solicit a response from the STA 121 using RTS message 711. STA 121 may respond with CTS message 713 if STA 121 finds the channel $C_1$ to be idle based on CCA and virtual CS. AP 110 may receive, demodulate and process the payload of the message 713 received on the channel $C_1$. AP 110 may then respond with trigger frame 715 soliciting UL data messages 717 and 715 from STAs 124 and 121 respectively.

STA 122 may observe the channel $C_2$ during the time interval 720. AP 110 may then solicit a response from the STA 122 using RTS message 721. STA 122 may respond with CTS message 723 if STA 122 finds the channel $C_2$ to be idle based on CCA and virtual CS. In some instances, AP 110 may sense the CTS message 723 only as signal energy only, without demodulating it. However AP 110 may still detect that a message was sent on the channel $C_2$ after its trigger message 721 on the channel $C_1$. AP 110 may then respond with trigger frame 725 soliciting UL data messages 737 from STA 122.

In some embodiments, no STA is assigned to observe the channel $C_3$ during the time interval 730. STA 123 may observe the channel $C_4$ during the time interval 740. AP 110 may then solicit a response from STA 123 using RTS message 741 (including two non-HT duplicate RTS frames). STA 123 may respond with a CTS message 743 (including two non-HT duplicate CTS frames) if STA 123 finds the channel $C_4$ to be idle based on CCA and virtual CS. Note that a non-HT duplicate transmission is used to transmit to non-HT OFDM STAs, HT STAs, or VHT STAs that may be present in a part of a 40 MHz, 80 MHz, or 160 MHz channel. AP 110 may receive the frame 743 as signal energy only, without demodulating it. However AP 110 may still sense that a message was sent on the channels $C_3$ and $C_4$ after its trigger message 741 on the channel $C_4$. AP 110 may then respond with trigger frames 725 and 735 soliciting UL data 747, 737 and 735 from STAs 123, 125, and 126, respectively. UL data 747 may span portions of both $C_3$ and $C_4$, for example.

Figure 8A:
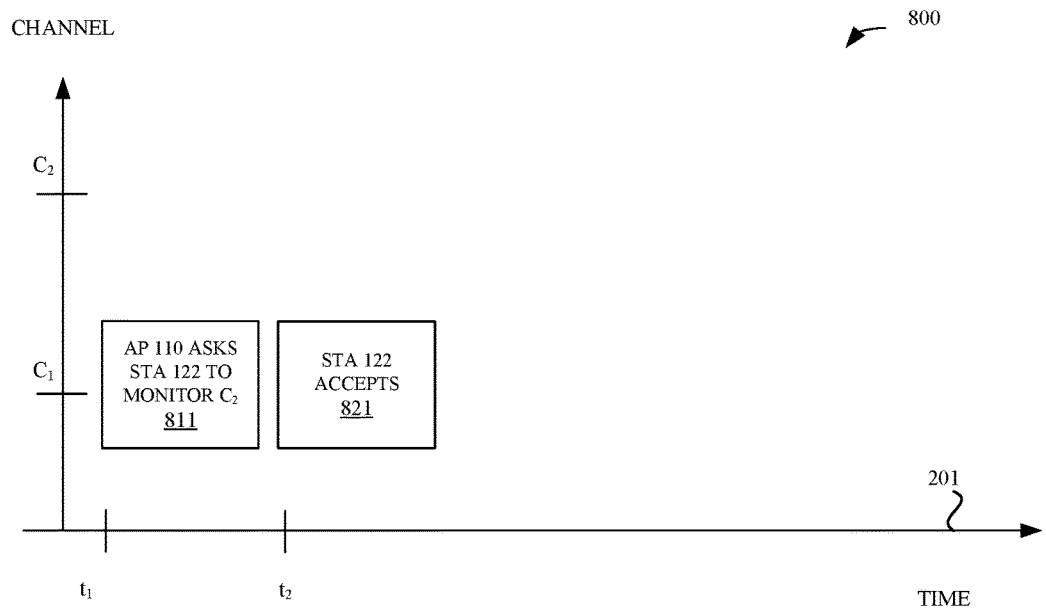
FIG. 8A illustrates an example of an AP asking a STA for monitoring help.
Figure 8B:
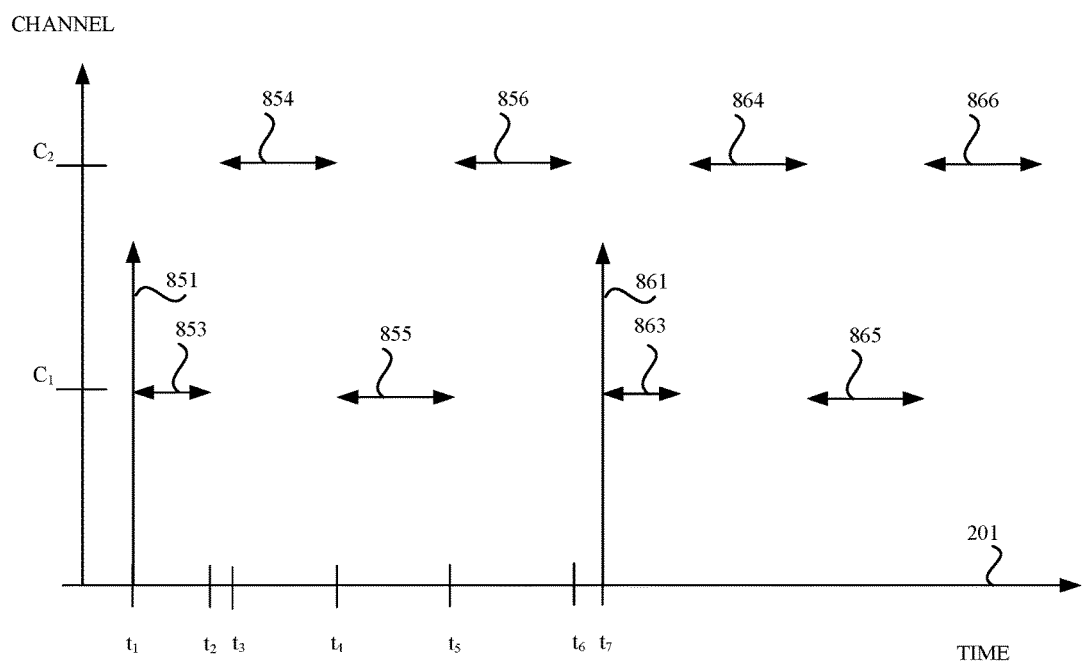
FIG. 8B illustrates an exemplary observation interval scheme.

FIGS. 8A and 8B illustrate events during the time to command 750 and the time to obtain NAV 751, respectively. FIG. 8A illustrates AP 110 asking STA 122 to help monitor channel $C_2$. For example, AP 110, at time $t_1$ on channel $C_1$, asks STA 122 with message 811 to monitor channel $C_2$. At time $t_2$ STA 122 accepts with message 821.

FIG. 8B illustrates some of the configuration parameters sent by AP 110 to STA 122 to perform the monitoring. Beacons 851 and 861 at times $t_1$ and $t_7$ on the channel $C_1$ are illustrated. Beacon time offset value 853 extends from $t_1$ to $t_2$ (similarly the beacon offset value recurs as 863). STA 122 will monitor the channel $C_2$ during recurring time intervals. Examples of the recurring monitoring intervals are 854, 856, 864, and 866. A time between intervals extends from $t_4$ to $t_5$ and is denoted 855 (similarly 865 between 864 and 866). During the times 853, 855, 863, and/or 865, the STA 122 may sleep (power down for example, its radio circuits). The NAV and CCA information determined by STA 122 on C2 may be transmitted to the AP 110 in the message 723 of FIG. 7.

AP 110 may not assign a STA to obtain NAV at every channel on which the AP operates. The AP 110 may detect the primary channels of OBSSs and allocate a STA to receive only at those channels. An overlapping basic service set (OBSS) may be a basic service set (BSS) operating on the same channel as the STA's BSS and within (either partly or wholly) its basic service area (BSA).

AP 110 may not have enough associated STAs for every channel, or monitoring may consume too much STA power. AP 110 may know which STAs operate in active mode, or know which STAs are not power limited (e.g., which STAs have access to a wired power source such as an electrical wall outlet). AP 110 may command the active mode and/or non-power limited STAs to monitor for NAV information at secondary channels. AP 110 may avoid additional channel monitoring (NAV obtaining) for those STAs that operate in a power save mode. The AP 110 may rotate assignments of channel monitoring among the power saving to achieve a balance of power consumption among the power saving STAs.

AP Signaling with Reserving: Method and Logic

An AP reserving method, in some embodiments, includes: i) sending a first reserving message to a first STA requesting that the first STA monitor a first channel, ii) sending a second reserving message to a second STA requesting that the second STA monitor a second channel, iii) sending a first RTS message on the first channel to the first STA, iv) sending a second RTS message on the second channel to the second STA, v) observing, responsively to the first RTS message, a first CTS message from the first STA, wherein observing comprises sensing using CCA or receiving using virtual carrier sense (virtual CS), and/or vi) sending a first trigger frame on the first channel, wherein the first trigger frame is based on the first CTS message, and wherein the first trigger frame provides one or more STAs with an opportunity to transmit UL data.

In some embodiments of the AP reserving method, the first channel is a 20 MHz channel defined in compliance with an IEEE standard and/or a Wi-Fi certification.

Some embodiments of the AP reserving method also include: i) sending a third reserving message to a third STA requesting that the third STA monitor a third channel, wherein a bandwidth of the third channel is greater than a bandwidth of the first channel, ii) sending a third RTS message to the third STA, and/or iii) receiving, responsively to the third RTS message, a third CTS message from the third STA.

In some embodiments of the AP reserving method, the first channel is a 20 MHz channel and the third channel is a 40 MHz channel and the first and second channels are defined in compliance with an IEEE standard.

In some embodiments of the AP reserving method, the 40 MHz channel has a first 20 MHz portion and a second 20 MHz portion, and the third CTS message is not based on the second 20 MHz portion.

Figure 9:
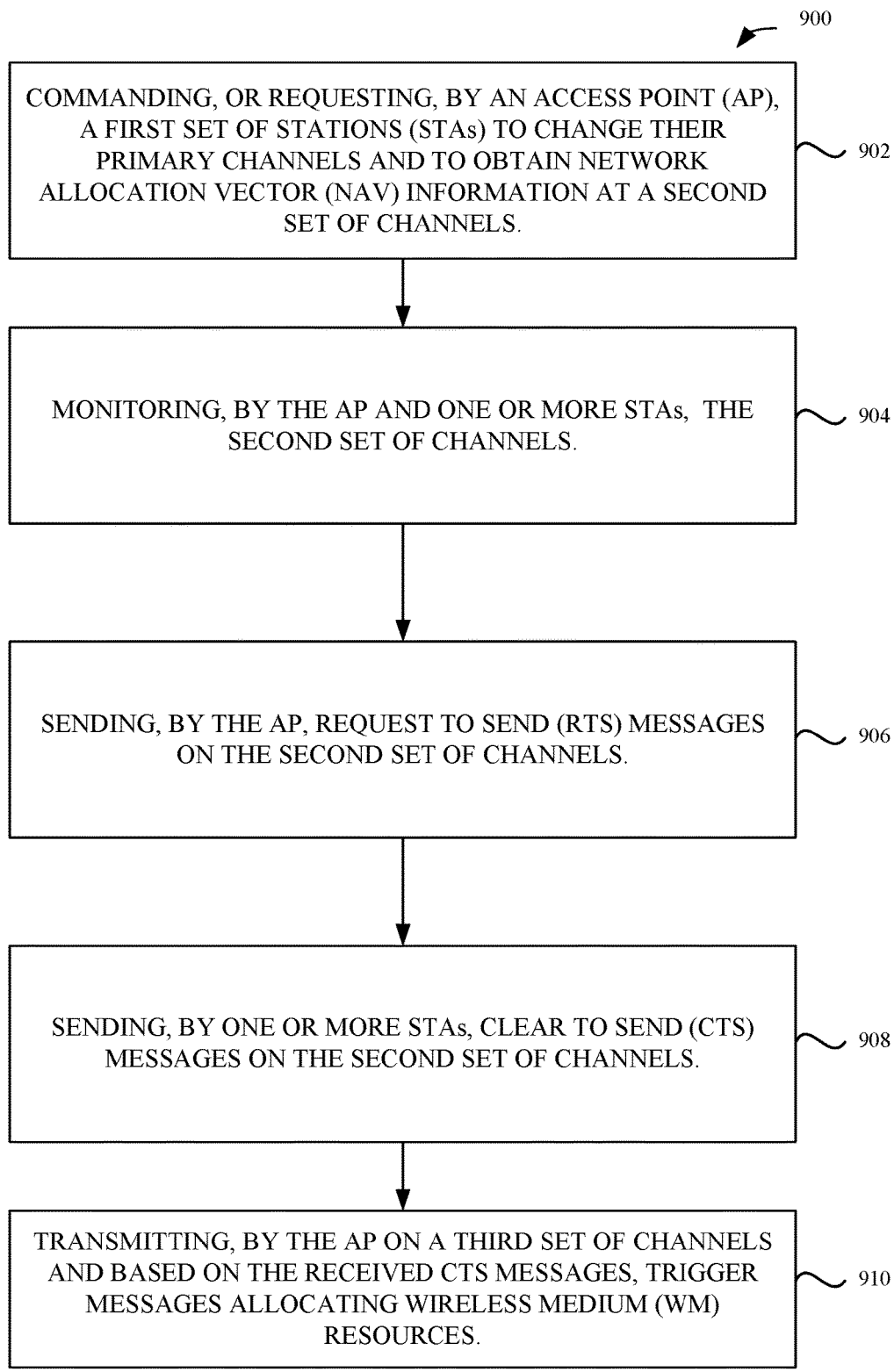
FIG. 9 illustrates exemplary logic illustrative of the events of FIG. 7, according to some embodiments.

FIG. 9 illustrates exemplary logic corresponding to events of FIGS. 7, 8A, and 8B. At 902, an AP commands or requests that a set of STAs change their primary channels and obtain NAV information at a second set of channels. FIG. 8A is an example of 902. At 904, the AP and one or more STAs, for example, monitor the second set of channels. The AP, at 906, sends RTS messages on the second set of channels. The channels used for the RTS messages will depend on the results of the AP monitoring, in general. At 908, one or more STAs, for example, respond to the RTS messages of 906 with CTS messages on the second set of channels. If a STA monitoring a channel in the second set of channels detects the channel to be not idle, it may not send a CTS message. At 910, the AP uses the information it learned about the channel medium to determine a third set of channels to use in addressing one or more STAs and transmits trigger frames accordingly.

Representative Exemplary Apparatus

Figure 10:
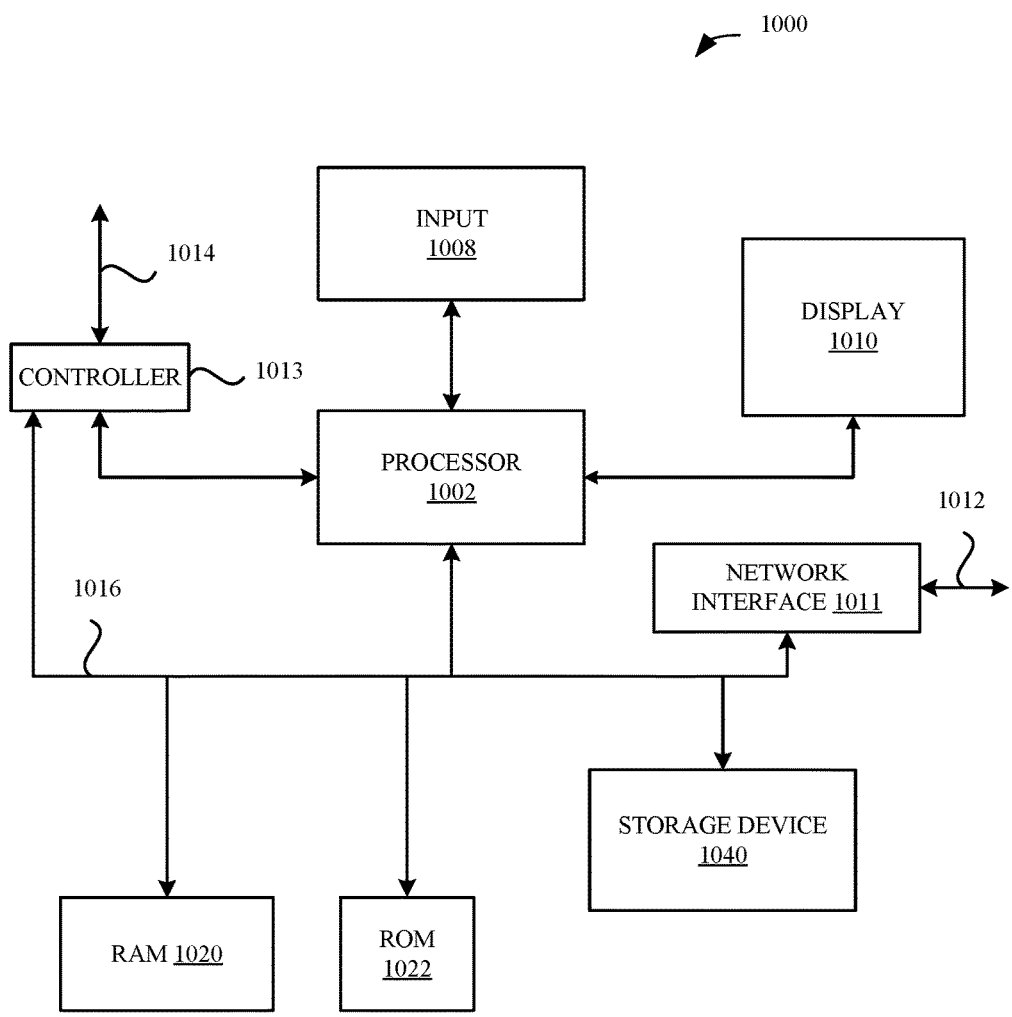
FIG. 10 illustrates an exemplary apparatus for implementation of the embodiments disclosed herein.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the STA 121, STA 122, STA 123, STA 124, STA 126 and/or AP 110. illustrated in FIG. 1 and succeeding figures. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, by a wireless local area network (WLAN) access point (AP), the method comprising:
    setting a first duration value in a first duration field of a first multi-user request to send (MU-RTS) frame, wherein the first duration value is based on a clear to send (CTS) timeout value;
    setting a second duration value in a second duration field of the first MU-RTS frame, wherein the second duration value is based on a remaining transmission opportunity (TXOP) duration;
    addressing the first MU-RTS frame, at least in part, to a first WLAN station (STA);
    setting the first duration value in the first duration field of a second MU-RTS frame;
    addressing the second MU-RTS frame, at least in part, to a second STA; and
    transmitting the first and second MU-RTS frames at a first time.

2. The method of claim 1, wherein the first MU-RTS frame is addressed to multiple STAs.

3. The method of claim 1, wherein the second MU-RTS frame is a copy of the first MU-RTS frame.

4. The method of claim 1, wherein the transmitting the first and second MU-RTS frames includes transmitting a single protocol layer convergence procedure protocol data unit (PPDU), wherein the single PPDU is transmitted on a first channel and a second channel.

5. The method of claim 4, further comprising:
    receiving a clear to send (CTS) frame on the first channel from the first STA at a second time, wherein the CTS frame comprises a third duration field populated with the second duration value.

6. The method of claim 5, further comprising:
    setting a third duration value in a fourth duration field of a first trigger frame, wherein the third duration value is based on an uplink (UL) PPDU transmission duration;
    addressing the first trigger frame to the first STA; and
    sending the trigger frame on the first channel at a third time.

7. The method of claim 6, further comprising:
    sensing no response on the second channel from the second STA to the second MU-RTS frame.

8. The method of claim 7, further comprising:
    receiving uplink data on the second channel from a third STA after the third time, wherein a configuration of the CTS timeout value in the second MU-RTS frame by the AP permits a transmission of the uplink data by the third STA when the second STA fails to respond.

9. A wireless local area network (WLAN) access point (AP) comprising:
    a wireless transceiver;
    a memory; and
    one or more processors, wherein the memory includes instructions that when executed by the one or more processors cause the AP to perform operations comprising:
        setting a first duration value in a first duration field of a first multi-user request to send (MU-RTS) frame, wherein the first duration value is based on a clear to send (CTS) timeout value, setting a second duration value in a second duration field of the first MU-RTS frame, wherein the second duration value is based on a remaining transmission opportunity (TXOP) duration, addressing the first MU-RTS frame, at least in part, to a first WLAN station (STA), setting the first duration value in the first duration field of a second MU-RTS frame, addressing the second MU-RTS frame, at least in part, to a second STA, and transmitting, via the wireless transceiver, the first and second MU-RTS frames at a first time.

10. The AP of claim 9, wherein the first MU-RTS frame is addressed to multiple STAs.

11. The AP of claim 9, wherein the transmitting the first and second MU-RTS frames includes transmitting a single protocol layer convergence procedure protocol data unit (PPDU), wherein the single PPDU is transmitted on a first channel and a second channel.

12. The AP of claim 11, wherein the operations further comprise:

receiving a clear to send (CTS) frame on the first channel from the first STA at a second time, wherein the CTS frame comprises a third duration field populated with the second duration value.

13. The AP of claim 12, wherein the operations further comprise:

setting a third duration value in a fourth duration field of a first trigger frame, wherein the third duration value is based on an uplink (UL) PPDU transmission duration;

addressing the first trigger frame to the first STA; and sending, via the wireless transceiver, the trigger frame on the first channel at a third time.

14. The AP of claim 13, wherein the operations further comprise:

sensing, using the wireless transceiver, no response on the second channel from the second STA to the second MU-RTS frame.

15. The AP of claim 14, wherein the operations further comprise:

receiving, via the wireless transceiver, uplink data on the second channel from a third STA after the third time, wherein a configuration of the CTS timeout value in the second MU-RTS frame by the AP permits a transmission of the uplink data by the third STA when the second STA fails to respond.

16. An apparatus configurable for operation in a wireless local area network (WLAN) access point (AP), the apparatus comprising:

one or more processors; and a memory communicatively coupled to the one or more processors and storing instructions that, when executed by the one or more processors, cause the AP to perform operations comprising:

setting a first duration value in a first duration field of a first multi-user request to send (MU-RTS) frame, wherein the first duration value is based on a clear to send (CTS) timeout value, setting a second duration value in a second duration field of the first MU-RTS frame, wherein the second duration value is based on a remaining transmission opportunity (TXOP) duration, addressing the first MU-RTS frame, at least in part, to a first WLAN station (STA), setting the first duration value in the first duration field of a second MU-RTS frame, addressing the second MU-RTS frame, at least in part, to a second STA, and transmitting, via the wireless transceiver, the first and second MU-RTS frames at a first time.

17. The apparatus of claim 16, wherein the transmitting the first and second MU-RTS frames includes transmitting a single protocol layer convergence procedure protocol data unit (PPDU), wherein the single PPDU is transmitted on a first channel and a second channel.

18. The apparatus of claim 17, wherein the operations further comprise:

receiving a clear to send (CTS) frame on the first channel from the first STA at a second time, wherein the CTS frame comprises a third duration field populated with the second duration value.

19. The apparatus of claim 18, wherein the operations further comprise:

setting a third duration value in a fourth duration field of a first trigger frame, wherein the third duration value is based on an uplink (UL) PPDU transmission duration;

addressing the first trigger frame to the first STA; and sending, via the wireless transceiver, the trigger frame on the first channel at a third time.

20. The AP of claim 19, wherein the operations further comprise:

sensing, using the wireless transceiver, no response on the second channel from the second STA to the second MU-RTS frame; and receiving, via the wireless transceiver, uplink data on the second channel from a third STA after the third time, wherein a configuration of the CTS timeout value in the second MU-RTS frame by the AP permits a transmission of the uplink data by the third STA when the second STA fails to respond.

* * * * *